United States Patent [19]

Haertle

[11] 3,849,225

[45] Nov. 19, 1974

[54] METHOD OF FORMING AN APPLICATOR CONSTRUCTION

[75] Inventor: Richard J. Haertle, Brookfield, Wis.

[73] Assignee: Kleen Test Products, Inc., Milwaukee, Wis.

[22] Filed: Jan. 10, 1973

[21] Appl. No.: 322,407

[52] U.S. Cl............... 156/213, 15/118, 15/209, 15/244, 156/250, 161/42, 161/149, 161/190
[51] Int. Cl...... B29c 3/00, B32b 31/18, B32b 1/04, B32b 27/40
[58] Field of Search............. 156/213, 251, 250; 15/244 B, 209 R, 118; 161/149, 190, 42, 44

[56] References Cited
UNITED STATES PATENTS

| | | | |
|---|---|---|---|
| 2,904,814 | 9/1959 | Scholl............................. | 156/251 X |
| 3,040,353 | 6/1962 | Gray................................ | 15/118 |
| 3,144,372 | 8/1964 | Peterson et al................. | 156/251 |
| 3,466,214 | 9/1969 | Polk et al........................ | 156/213 |

Primary Examiner—Philip Dier
Attorney, Agent, or Firm—Andrus, Sceales, Starke & Sawall

[57] ABSTRACT

An applicator for applying wax or other materials to a surface comprising a core of resilient cellular material, and layers of a fusible thermoplastic resin are applied to opposite faces of the core. The resin layers are covered by an absorbent fabric to provide a composite structure. The edges of the composite structure are sealed by application of heat and pressure which fuses the cellular core material and the thermoplastic resin and impregnates the fused materials within the fabric to provide an integral bond between the members.

3 Claims, 5 Drawing Figures

PATENTED NOV 19 1974 3,849,220

METHOD OF FORMING AN APPLICATOR CONSTRUCTION

BACKGROUND OF THE INVENTION

Applicators are frequently used for applying wax, polish or cleaners to articles such as furniture, automobiles and the like. In many cases the wax is sold in cans and the applicator is circular in shape and sized to fit within the car or within a cover for the can.

The conventional applicator includes a resilient foam rubber or foam plastic core which is covered with absorbent layers of cotton fabric. The peripheral edges of the fabric are joined by stitching, and the stitching process requires skilled operators and substantial time, which increases the overall cost of fabrication of the applicator.

SUMMARY OF THE INVENTION

The invention is directed to an improved applicator for applying wax or other materials to a surface, which eliminates the necessity of stitching the edges of the applicator. In accordance with the invention, the applicator comprises a generally circular core of resilient cellular material, such as polyurethane foam, and layers of a thermoplastic resin are applied to the opposite surfaces of the core. The resin layers are covered by an absorbent fabric, such as cotton, to provide a composite structure.

The peripheral edges of the composite structure are sealed by the application of heat and pressure, which fuses the foam plastic and thermoplastic resin, and the fused materials impregnate within the fabric covering to provide an integral bond between the members.

The resultant applicator has an attractive sealed edge in which the fabric, resin layers, and foam plastic are integrally bonded together.

The heat sealing of the edges of the applicator eliminates the costly hand-stitching operations that have been used in the past and thereby substantially reduces the cost of fabrication of the applicator.

DESCRIPTION OF THE PREFERRING EMBODIMENT

Figure 1:
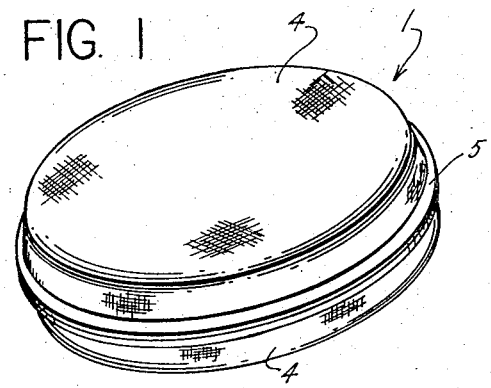
FIG. 1 is a perspective view of the applicator formed in accordance with the invention.
Figure 2:
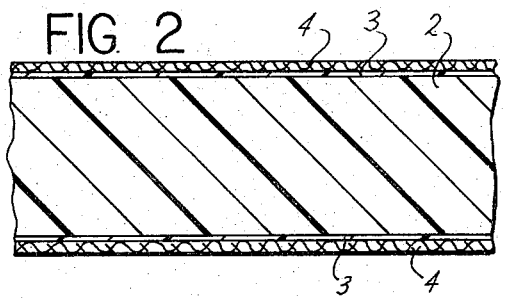
FIG. 2 is a transverse section of the applicator.

FIG. 1 shows an applicator 1 for applying wax polish, cleaner or other materials to a surface which comprises a core 2, and layers 3 of a thermoplastic resin are located on opposite surfaces of the core. The resin layers in turn are covered by fabric covering 4, and the peripheral edge 5 of the applicator 1 is heat sealed to provide an integral structure.

The core 1 is formed of a resilient, cellular material such as polyurethane foam. The core material should be capable of fusing during the heat sealing operation, but should not char or decompose at the temperatures involved. The polyurethane foam is particularly satisfactory for use as the core 1 because it fuses at a temperature of about 375° to 400°F, thereby enabling die temperatures in the range of 450° to 500°F to be employed.

The thermoplastic resin layers 3 may be utilized as separate sheets of the resin, or alternately, the resin layer can be applied as a coating to either the outer surface of the core 2 or the inner surface of the fabric 4. The resin layers 3 can take the form of polyvinyl chloride, polyethylene or the like and is adapted to fuse or melt during the heat-sealing operation.

The outer fabric layers 4 are preferably formed of an absorbent material and can take the form of cellulosic materials, such as cotton, animal fiber materials, such as wool, and the like.

Figure 3:
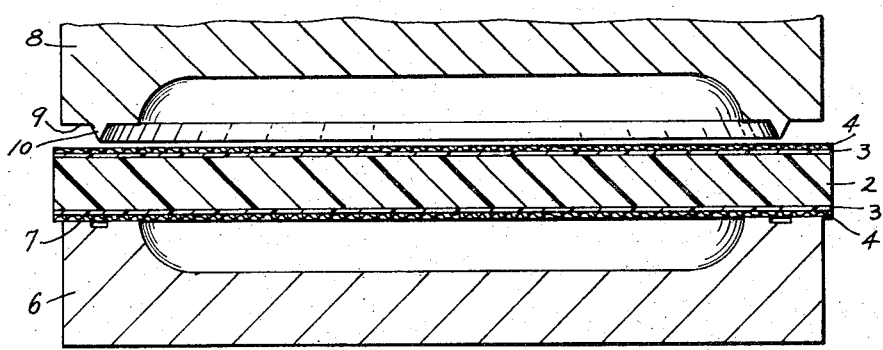
FIG. 3 is a view of the materials as located in the die.

In fabricating the applicator, the core 2, resin layers 3 and fabric layers 4 are positioned in superimposed relation on a lower die member 6, as illustrated in FIG. 3. The lower die can include one or more pockets or recesses which are bordered by generally flat annular surfaces 7. An upper die member 8 is mounted for movement toward and away from the lower die member 6 and is provided with a generally flat annular surface 9 which is adapted to register with the surface 7 of the lower die. In addition, the surface 9 is provided with an annular knife-like edge 10, which is utilized to sever the heat sealed edge of the applicator.

Figure 4:
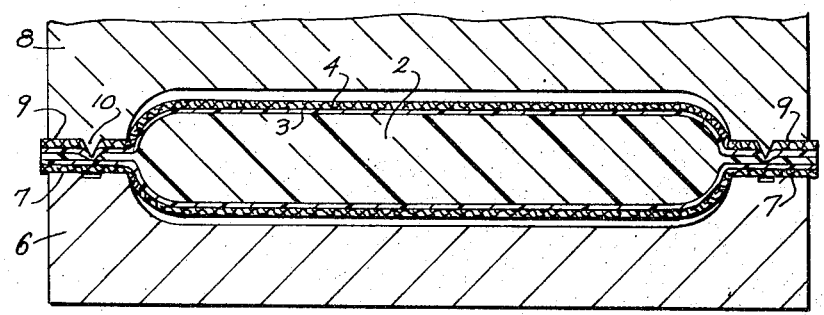
FIG. 4 is a view similar to FIG. 3 showing the die in the partially-closed position in which the peripheral edges of the materials are heat sealed.
Figure 5:
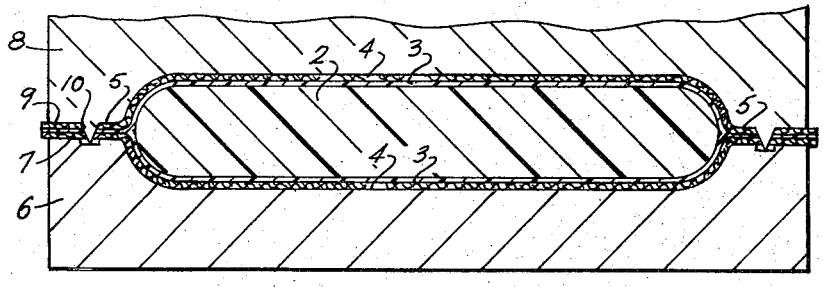
FIG. 5 is a view similar to FIG. 4 showing the operation of severing the heat sealed edge of the applicator.

It is preferred to heat both the upper and lower die members 6 and 8. With the composite structure positioned on the lower die, as illustrated in FIG. 3, the heated upper die 8 is moved downwardly in a first stroke, as shown in FIG. 4, and due to the application of heat and pressure, the peripheral edge portion of the core 2 and resin layers 3, which are between the cooperating surfaces 7 and 9, are melted or fused, and the fused material permeates the peripheral edge portion of the fabric layers 4 to provide an integral bond between the members.

In practice a pressure in the range of about 50 to 125 psi is employed and the die members are heated to a temperature in the range of 450°F to 500°F.

After a heat-sealing period in the range of 5 to 10 seconds, the upper die member 8 is moved downwardly in a second stroke which serves to bring the edge 10 into contact with the surface 7 to sever the fused peripheral edge portion of the composite structure.

While the above description has illustrated the process as used in forming a single applicator, it is contemplated that a continuous process can be employed in which the various components of the applicator are fed in sheet form through the heat sealing station where a series of applicators are simultaneously formed from the sheets or blanks.

The resultant applicator has an attractive heat-sealed edge in which the core material, resin layers 3 and fabric 4 are integrally bonded. The process of the invention eliminates the costly hand stitching which has been used in the past and thereby provides a substantial cost reduction for the fabrication of the applicator.

Various modes of carrying out the invention are contemplated as being within the scope of the following claims particularly pointing out and distinctly claiming the subject matter which is regarded as the invention.

I claim:

1. A method of forming an applicator to be used for applying a product to a surface, comprising the steps of applying layers of a fusible thermoplastic resin to opposite surfaces of a cellular resilient core material, applying a layer of absorbent fabric to the outer surface of each layer of resin to form a composite structure, providing a die including a pair of die members, said die members having cooperating generally flat peripheral pressure surfaces and having cooperating cutting elements located intermediate the inner and outer extremities of said pressure surfaces, applying pressure through said pressure surfaces to the peripheral edge portion of the composite structure while maintaining the cutting elements out of cooperating cutting relationship, heating said peripheral edge portion to a temperature sufficiently high to fuse the core material and fuse the resin layers and impregnate the fused material into the fabric to provide an integrally bonded peripheral edge portion, and moving the cutting elements into cooperating cutting relationship to trim said bonded peripheral edge portion and provide an applicator having an outwardly projecting fused peripheral edge.

2. The method of claim 1, wherein the pressure is in the range of 50 to 125 psi and the peripheral edge portion is heated to a temperature in the range of 450° to 500°F.

3. A method of forming an applicator to be used for applying a product to a surface, comprising the steps of applying layers of a fusible thermoplastic resin to opposite surfaces of a fusible cellular resin core material, applying a cover layer of absorbent fabric to the outer surface of each layer of resin to form a composite structure, said fabric being formed of a material having a fusion temperature substantially above the fusion temperature of the resin layer and the core, applying pressure to a peripheral edge portion of substantial width of the composite structure, heating said peripheral edge portion to a temperature sufficiently high to fuse the core material and the resin layers and beneath the fusion temperature of the fabric cover layer, the fused material penetrating into the fabric to provide an integrally bonded peripheral edge portion, and cutting the bonded peripheral edge portion at a location between the inner and outer extremities thereof to provide a trimmed applicator having an outwardly fused projecting peripheral edge.

* * * * *